United States Patent
Kutz et al.

(10) Patent No.: US 7,965,796 B2
(45) Date of Patent: Jun. 21, 2011

(54) CHANNEL ESTIMATION IN A RADIO RECEIVER

(75) Inventors: Gideon Kutz, Ramat Hasharon (IL); Mark Geles, Herzelia (IL); Amir Chass, Ramat Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 1056 days.

(21) Appl. No.: 10/505,999

(22) PCT Filed: Jan. 20, 2003

(86) PCT No.: PCT/EP03/00522
§ 371 (c)(1),
(2), (4) Date: Jun. 16, 2005

(87) PCT Pub. No.: WO03/073637
PCT Pub. Date: Sep. 4, 2003

(65) Prior Publication Data
US 2005/0232377 A1    Oct. 20, 2005

(30) Foreign Application Priority Data
Feb. 27, 2002  (GB) .................................. 0204587.0

(51) Int. Cl.
*H03D 1/00* (2006.01)
*H04L 27/06* (2006.01)
(52) U.S. Cl. ................... 375/340; 375/346; 375/362
(58) Field of Classification Search .............. 375/350, 375/360, 207, 343, 319, 227, 340, 130; 370/342, 370/347
See application file for complete search history.

(56) References Cited

U.S. PATENT DOCUMENTS

| | | | | |
|---|---|---|---|---|
| 5,140,615 | A * | 8/1992 | Jasper et al. | 375/347 |
| 5,414,734 | A * | 5/1995 | Marchetto et al. | 375/267 |
| 6,243,410 | B1 * | 6/2001 | LaRosa et al. | 375/148 |
| 6,272,167 | B1 * | 8/2001 | Ono | 375/144 |
| 6,314,131 | B1 * | 11/2001 | Roe et al. | 375/227 |
| 6,560,272 | B1 | 5/2003 | Komatsu | |
| 6,757,272 | B1 * | 6/2004 | Abeta et al. | 370/342 |
| 6,931,054 | B2 * | 8/2005 | Schmidt et al. | 375/148 |
| 7,161,973 | B2 * | 1/2007 | Ghosh | 375/147 |
| 7,167,456 | B2 * | 1/2007 | Iwamatsu et al. | 370/321 |
| 7,301,991 | B2 | 11/2007 | Okumura et al. | |
| 7,333,420 | B2 * | 2/2008 | Higuchi et al. | 370/208 |

(Continued)

FOREIGN PATENT DOCUMENTS
EP    1032168 A2    2/2000
(Continued)

OTHER PUBLICATIONS

Abeta et al., "Performance Comparison Between Time-Multiplexed Pilot Channel and Parallel Pilot Channel for Coherent Rake Combining in DS-CDMA Mobile Radio," *IEICE Trans. Commun.*, vol. E81-B, No. 7, Jul. 1998, pp. 1417-1425.

(Continued)

*Primary Examiner* — Chieh M Fan
*Assistant Examiner* — Qutbuddin Ghulamali

(57) ABSTRACT

A channel estimation method suitable for use in a CDMA communications system employs a high order interpolation using four interpolation points per slot. Four FIR interpolation filters (18-21) produce a channel estimate for each quarter of a slot by weighting the summed pilots of four slots by amounts related to pre-computed polynomial co-efficients. The invention has been shown wot mobiles and has the advantage of low computational complexity.

20 Claims, 1 Drawing Sheet

U.S. PATENT DOCUMENTS

Figure 1:
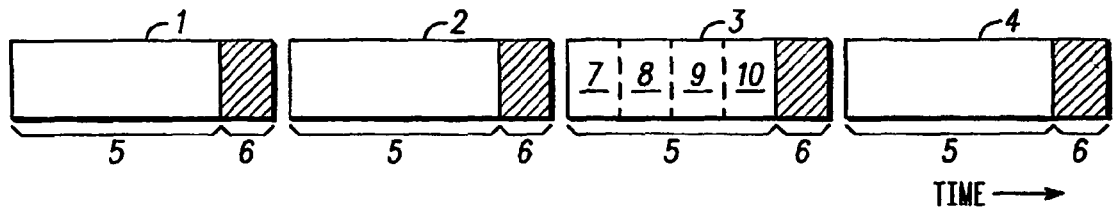

2001/0038665 A1    11/2001    Baltersee et al.

FOREIGN PATENT DOCUMENTS

| EP | 1139628 A2 | 3/2001 |
| --- | --- | --- |
| JP | 11284600 | 3/1998 |
| JP | 11284600 | 10/1999 |
| JP | 2000-049662 | 2/2000 |
| JP | 2000-253080 | 9/2000 |
| TW | 260852 | 10/1995 |
| TW | 308762 | 6/1997 |
| TW | 411672 | 11/2000 |
| WO | 0067389 | 4/2000 |
| WO | 0060761 | 12/2000 |
| WO | 0161949 A1 | 2/2001 |
| WO | 0113595 A1 | 8/2001 |

OTHER PUBLICATIONS

Andoh et al., "Channel Estimation Filter Using Time-Multiplexed Pilot Channel for Coherent Rake Combining in DS-CDMA Mobile Radio," *IEICE Trans. Commun.*, vol. E81-B, No. 7, Jul. 1998, pp. 1517-1525.

Popper et al., "Frame-oriented Channel Estimation for UTRA/FDD with LSE Polynomial Fitting," *VTC 2000, IEEE 51$^{st}$ Vehicular Technology Conference Proceedings*, Tokyo, Japan, May 15-18, 2000, vol. 3 of 3, Conf. 51, May 15, 2000, pp. 2128-2132.

PCT International Search Report PCT/EP03/00522 mailed May 28, 2003.

Application No. 03804834.5, Chinese Office Action, Rejection, dated Sep. 8, 2006.

Application No. 092102860, Taiwan Search Report dated Dec. 17, 2007.

Application No. 2009-011484, Japanese Office Action—Rejection, dated Apr. 24, 2009.

Application No. 2003-572197, Japanese Office Action—Rejection, dated Jan. 29, 2009.

Application No. 2003-572197, Japanese Office Action—Rejection, dated Jun. 18, 2009.

Application No. 2003-572197, Japanese Office Action—Rejection, dated Oct. 23, 2009.

\* cited by examiner

CHANNEL ESTIMATION IN A RADIO RECEIVER

This invention relates to radio receivers and particularly, though not exclusively, to radio receivers for code-division multiple access (CDMA) cellular communications systems.

In a cellular communications system, a plurality of base stations provides a radio telecommunications service to a plurality of remote subscriber units often termed mobile stations. Each base station defines a particular geographical area or cell proximate to the base station to produce coverage areas.

Multiple access techniques permit the simultaneous transmissions from several mobile stations to and from a single base station. One type of multiple access technique is known as code division multiple access (CDMA), which employs spread-spectrum signalling. Individual users in the CDMA communications system use the same carrier frequency but are separated by the use of individual spreading codes. Hence, multiple communications channels are assigned using a plurality of spreading codes within the portion of radio spectrum, each code being uniquely assigned to a mobile station. In direct sequence CDMA communication systems, the signals are, prior to being transmitted, multiplied by a high rate code whereby the signal is spread over a larger frequency spectrum. A narrow-band signal is thus spread and transmitted as a wide-band signal. At the receiver the original narrow-band signal is re-generated by multiplication of the received signal with the same code. A signal spread by use of a different code will, at the receiver, not be de-spread but will remain a wide-band signal.

In wide-band CDMA (W-CDMA) to be used in third generation cellular communications systems, symbols are transmitted using quadrature phase shift keying and direct sequence CDMA. Each of a plurality of physical channels is organised in a frame structure with a fixed number of slots in each frame. Each slot comprises a series of data symbols and series of pilot symbols. The pilot symbols may be used to estimate the characteristics of the propagation channel and to perform synchronisation.

In CDMA systems, a RAKE receiver is commonly used as a low-complexity solution for a CDMA receiver. An example of a RAKE receiver design is disclosed in U.S. Pat. No. 6,215,814.

One of the functions of a RAKE receiver is the separation of the multipath propagated signal components.

Multipath propagation arises due to a transmitted signal arriving at the receiver via a number of paths. For example, one received signal may pass directly from a base station to a mobile station and another may be reflected off a building behind the mobile station and then back to the mobile station. There will be a time delay between reception of these two signals. Multipath effects results in a degradation (or fading) of the desired signal.

Another function of a RAKE receiver (which generally comprises a plurality of RAKE fingers), is the estimation of the properties of the multi-path communications channels.

A further example of a RAKE receiver using a particular method of channel estimation; viz weighted multi-slot averaging (WSMA), is disclosed in the $8^{th}$ IEEE International Symposium on Personal, Indoor and Mobile Radio Communications, Technical Programme Proceedings, Waves of the Year 2000+PIMRC'97, "Channel Estimation Using Time Multiplexed Pilot Symbols For Coherent RAKE Combining For DS-CDMA Mobile Radio" by H. Andoh et al. Therein, the received multi-path signal is de-spread by a matched filter to be resolved into several, faded, narrow-band-modulated signals that have propagated along different paths having different time delays. Each of these resolved signals is applied to a finger of the RAKE Receiver. In each finger, a channel estimation is performed on each resolved narrow-band signal by using time multiplexed pilot symbols. Each resolved, complex-represented, narrow-band modulated signal is weighted with the complex conjugate of the channel estimate to be coherently combined in a RAKE combiner, with signals output from the other fingers.

In general, channel estimation outputs are used to compensate for each path attenuation and phase prior to combining the paths to produce the RAKE output. Therefore, non-accurate channel estimation will result in non-coherent combining of the paths and therefore in significant performance degradation.

To facilitate high quality channel estimations, there are two types of pilots in the W-CDMA standard. User-dedicated pilots are transmitted as part of the dedicated control channel (DPCCH) which is time-multiplexed with the dedicated data channel (DPDCH). The common pilot channel (CPICH) transmits a continuous pilot which can be received by all mobile stations in a cell and which is several dBs stronger than the dedicated channel.

Beam forming is a mandatory feature for a mobile station in Release 4 of the 3 GPP (third generation partnership project) Standard. With this feature, only the dedicated pilot of the dedicated data channel can be used for channel estimation purposes because the common pilot channel is transmitted with different antenna weights and therefore is affected by a different multi-path profile. So it would be useful to develop a channel estimation technique which had the ability to work with both DPCCH and CPICH as well as with the DPCCH alone.

Preferably, W-CDMA systems should support mobile station velocities of up to 500 kph. Most known channel estimation schemes work well for low velocity mobile stations, but have poor performance at high velocities.

The inability to produce reliable channel estimates for high velocity mobile stations is the main drawback of the WMSA method (which is usually based on the DPCCH pilots). This problem occurs because the fading rate of a channel is proportional to the mobile station's velocity.

Other alternative solutions have been proposed. In IEEE, $53^{rd}$ Vehicular Technology Conference, Rhodes, Greece, VTC, 2001—Spring, 2001, "Channel Estimation Algorithms For Third Generation W-CDMA Communication Systems", by K. A. Qaraqe et al, multi-slot averaging combined with linear interpolation is described. Although this scheme improves significantly the performance compared with WMSA, the linear interpolation does not provide adequate performance for some high velocities.

A second order interpolation is proposed in $5^{th}$ Asia-Pacific Conference On Communications and $4^{th}$ Opto-Electronics and Communications Conference, APCC/OECC'99, proceedings conference-vitality to the new century, page 582-5, volume 1, 1999, "A Novel Method of Channel Estimation for W-CDMA", by D. Xiaojian et al. A higher order interpolation based on pilots from a frame is suggested in IEEE, $51^{st}$ Vehicular Technology Conference Proceedings, VTC, 2000, Spring, 2000, pages 2128-32, volume 3, 2000, "Frame-Oriented Channel Estimation for UTRA/FDD with LSE, Polynomial Fitting", by A. Popper et al.

However, all known high order interpolation methods have high computational complexity and often a large delay also. Also, for very high speed mobile stations, even second order interpolation is not enough.

Hence, there is a need for a channel estimation scheme for high speed mobile stations which combines a superior performance over known schemes on one hand with a very low computational complexity on the other hand.

According to the present invention, there is provided receiving apparatus for computing channel estimates from a received signal having a slotted structure each slot comprising a sequence of data symbols and a sequence of pilot symbols, the receiver apparatus including;

M summers for summing the pilot symbols of each of M-slots, each summer producing an output x(i), J interpolation filters having inputs x(i), where J specifies a chosen number of time instances of one of the M-slots, a computation module connected to each of the J interpolation filters for computing filter co efficients Fj,i therefor depending upon chosen time instances Tj of the said one of the M-slots, time instances of the pilot symbols and a chosen polynomial interpolation order N, whereby each interpolation filter is configured to compute a channel estimate, $$ChanEst_j = \sum_{i=0}^{M-1} F_{j,i} x(i)$$

for one of said time instances Tj, where j takes a value O, . . . J−1.

The invention can work with a combination of pilot symbols from the CPICH and DPCCH or DPCCH pilot symbols alone and can be used as a good basis for a second iteration to further improve performance.

The receiving apparatus of the present invention may be located in a base station or a mobile station.

Figure 2:
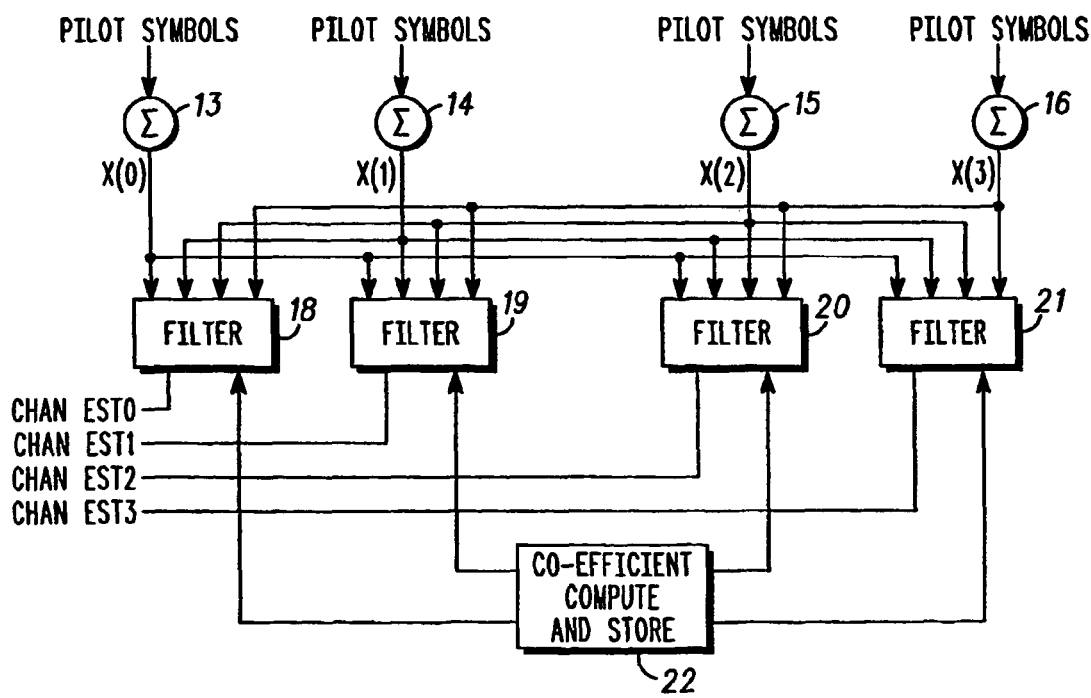

An embodiment of the invention will now be described, by way of example only, with reference to the drawings, of which;

FIG. 1 is a schematic diagram showing the slotted structure of a W-CDMA signal, and FIG. 2 is a block diagram of channel estimation apparatus in accordance with the invention.

A wide-band CDMA signal is transmitted from a remote transmitter located in a base station, for example, and travels via a plurality of propagation channels to a receiver, located for example in a mobile station. As is conventional, the received signal is de-spread by a matched filter where it is resolved into a plurality of narrow-band modulated signals that have propagated through the different channels, each channel having different propagation characteristics. Each of the narrow-band modulated signals is processed by one of a plurality of fingers of RAKE receiver prior to being fed into a RAKE combiner and thereon for further processing.

Each finger of the RAKE receiver is modified in accordance with the invention in order to provide channel estimates.

Four slots 1, 2, 3, 4 of one of the narrow-band modulated signals applied to a RAKE receiver finger are represented as shown in FIG. 1. Time is increasing from left to right and slot 3 is designated as the "current slot" for which channel estimations are to be performed. Each slot comprises two portions, one, 5 comprising data symbols and another 6 comprising pilot symbols (shown hatched). The data portion 5 of the current slot 3 is notionally divided into four quarters, 7, 8, 9, 10 and a channel estimation for each of these quarters is determined by the invention.

Although in this example four slots are chosen for the channel estimation procedure, more or less than four may be used.

Similarly, although the current slot is notionally divided into four parts in this example, more or less than four parts may be chosen.

In FIG. 2, a RAKE finger is modified to include the following channel estimation modules. Four summation modules 13, 14, 15, 16 each have an output which is connected to four interpolation filters 18, 19, 20, 21. A first interpolation filter 18 has an output, $ChanEst_0$, which is an estimate of the channel for the first quarter 7 of the current slot 3.

A second interpolation filter 19 has an output, $ChanEst_1$ which is an estimate of the channel for the second quarter 8 of the current slot 3. A third interpolation filter 20 has an output, $ChanEst_2$, which is an estimate of the channel for the third quarter 9 of the current slot 3. A fourth interpolation filter 21 has an output, $ChanEst_3$, which is an estimate of the channel for the fourth quarter 10 of the current slot 3.

A co-efficient compute and store module 22 is preprogrammed and has an output connected to each of the filters 18-21.

The outputs of the filters, $ChanEst_0$, $ChanEst_1$, $ChanEst_2$, $ChanEst_3$ are used in a conventional manner to decode the data symbols comprising the first, second, third and fourth quarters respectively of the data symbol portion 5 of the current slot 3.

In operation, the summer 13 receives and sums the pilot symbols 6 from slot 1 and outputs the result x(0) to the inputs of each of the filters 18-21. Similarly, the summers 14, 15 and 16 receive and sum the pilot symbols from slots 2, 3 and 4 respectively and output their results, x(1), x(2), x(3) respectively, to further inputs of each filter 18-21.

Thus each filter 18-21 has four inputs in x(0), x(1), x(2) and x(3). These inputs are, in the filters, weighted differently and by amounts dictated by their filter co-efficients which are in turn, computed in the module 22 (in a manner to be described below and applied to each filter 18-21).

The inventors have observed that the linear and second order interpolations as proposed by other workers in this field do not perform adequately for very high mobile station velocities. The inventors have discovered that for high velocities a performance improvement can be gained by dividing the slots into four quarters and interpolating for each quarter separately. This is in contrast to certain known methods which interpolate for each symbol separately and which result in an unnecessary complexity increase.

The present invention proposes an approach based on high order interpolation but with only four interpolation points in a slot. For low complexity implementation, four point interpolation is performed with four simple FIR (finite-duration impulse response) filters configured as interpolation filters.

The interpolation polynomial of N order in a mean squares estimation sense is;

$$P(t) = P_0 + P_1 t + P_1 t + P_1 t^2 + \ldots + P_{N-1} t^{N-1}$$

And the general interpolation polynomial coefficients are determined by;

$$P = (A_N^t A_N)^{-1} A_N^t X = BX$$

Where;

$$A = \begin{bmatrix} 1 & t_0 & \cdots & \cdots & t_0^N \\ 1 & t_1 & \cdots & \cdots & t_1^N \\ \cdots & \cdots & \cdots & \cdots & \cdots \\ \cdots & \cdots & \cdots & \cdots & \cdots \\ 1 & t_{M-1} & \cdots & \cdots & t_{M-1}^N \end{bmatrix}, \quad X = \begin{bmatrix} x(0) \\ x(1) \\ \cdots \\ \cdots \\ x(M-1) \end{bmatrix}$$

In which, N is the polynomial order, M is the number of samples (slots), $t_0$-$t_{M-1}$ are time instances of the pilots and X are pilot sums for each slot.

In the preferred implementation, four fixed time instances, $T_0$-$T_3$ are chosen corresponding to the four quarters 7-10 of the current slot 3. The matrix B is also known, since its computation involves only the known time instances of the pilots.

The only varying part is the vector X which represents the coherent pilot sums of each of the M-slots involved in the interpolation.

The interpolation filter co-efficients can be therefore calculated as;

$$F_{j,i} = \sum_{k=0}^{N-1} b_{k,i}(T_j)^k$$

Where;
$F_{j,i}$ is the i co-efficient of interpolation filter j,
$b_{k,i}$ is the k,i element of the matrix B, and $T_j$ is the interpolation time instance for filter j.

These coefficients are pre-calculated in the module 22 and stored therein for use by each of the filters 18-21. The compute and store module 22 is pre-programmed with the parameters required for this computation, ie the chosen time Instances $T_0$-$T_3$ (corresponding to four quarters in this example) of the current slot, time instances of the pilot symbols and the chosen value for N.

Hence, the channel estimation at time instance $T_j$ is;

$$ChanEst_j = \sum_{i=0}^{M-1} F_{j,i} x(i)$$

Where j=0-3 and $ChanEst_0$ is used to decode data symbols in the first quarter of the current slot, $ChanEst_1$ is used to decode data symbols of the second quarter of the current slot, $ChanEst_2$ is used to decode the data symbols of the third quarter of the current slot and $ChanEst_3$ is used to decode data symbols of the fourth quarter of the current slot.

Thus the N-order interpolation can be implemented with simple FIR filters.

The invention has been found to provide significant performance improvement over the WMSA scheme while not adding significantly to the computational complexity. It also out-performs linear and second order interpolation methods in both performance under high velocity conditions and in computational complexity. In fact, the invention has a much lower computational complexity than known higher order interpolation methods and with comparable performance.

The invention can be usefully employed to produce DPCCH—based channel estimation. It can further be employed in combination with a CPICH estimation. For example, to enhance performance its output can be combined in a maximal ratio combining or fixed weight combination with a CPICH based channel estimation.

Further, the first iteration of the channel estimation may be used to make tentative decisions on the data symbols, thereby providing a continuous quasi-pilot for a second iteration. The quasi-pilot can be used in the second iteration to produce the channel estimation with a simple moving average window and without the need for any interpolation.

In certain circumstances, significant degradation of a received signal can occur, because of inter-path interference. The invention can be combined with an inter-path canceller to reduce this effect in the same manner as has been suggested in the document IEEE, $53^{rd}$ Vehicular Technology Conference, Rhodes, Greece, VTC 2001—Spring 2001 (A Novel Multi-path Interference Cancellation Scheme For RAKE Channel Estimation) by J. Baltersee et al.

The invention claimed is:

1. Receiver apparatus for computing channel estimates from a received signal having a slotted structure, each slot comprising a sequence of data symbols and a sequence of pilot symbols, the receiving apparatus including:
M summers for respectively summing the pilot symbols of each of M slots, where M is greater than 1 and the M summers produce respective M outputs x(i);
J interpolation filters each arranged to receive the outputs x(i) as inputs, where J specifies a chosen number of time instances of one of the M slots;
a computation module connected to each of the J interpolation filters for computing respective filter coefficients, $F_{j,i}$, therefor depending upon the chosen number of time instances Tj relating to said one of the M slots, time instances of the pilot symbols and a chosen polynomial interpolation order N greater than 2;
whereby each of the J interpolation filters is configured to compute a channel estimate, $$ChanEst_j = \sum_{i=0}^{M-1} F_{j,i} x(i)$$

for one of said chosen number of time instances Tj, where j takes a value 0, . . . , J–1.

2. The apparatus according to claim 1, in which the filter co-efficients $F_{j,i}$ are computed in accordance with the relationship;

$$F_{j,i} = \sum_{k=0}^{N-1} b_{k,i}(T)^k$$

where $b_{k,i}$ is a $(k, i)^{th}$ element of a matrix B, which relates to time instances of the pilot symbols;
where P=BX; and
where P is an interpolation polynomial of an order, N, and X is a vector representing the M outputs, x(i).

3. The apparatus according to claim 1 in which M=4 and j=4.

4. The apparatus according to claim 1, wherein the chosen number of time intervals of the M slots is greater than 1.

5. A method of computing channel estimates from a received signal having a slotted structure, each slot comprising a sequence of data symbols and a sequence of pilot symbols, the method including:

respectively summing the pilot symbols of each of the M slots using M summers to produce respective M outputs x(i), where M is greater than 1;

choosing a number of time instances J of one of the M slots;

providing J interpolation filters, each of the J interpolation filters receiving the M outputs x(i) as inputs;

computing respective filter coefficients, Fj,i, for each of the J interpolation filters depending upon the chosen number of time instances Tj relating to said one of the M slots, time instances of the pilot symbols and a chosen polynomial interpolation order N greater than 2; and computing, within each of the J interpolation filters, a channel estimate, $$ChanEst_j = \sum_{i=0}^{M-1} F_{j,i} x(i)$$

for one of said chosen number of time instances Tj, where j takes a value 0, ..., J−1.

6. The apparatus according to claim 1, further arranged to combine the computed channel estimates with a Common Pilot Channel (CPICH) estimation to produce a refined channel estimation.

7. The apparatus according to claim 6, wherein the chosen number of time intervals of the M slots is greater than 1.

8. The apparatus according to claim 1, further arranged to use the computed channel estimates to provide a quasi-pilot for a second iteration to produce a refined channel estimation.

9. The apparatus according to claim 8, wherein the chosen number of time intervals of the M slots is greater than 1.

10. The apparatus according to claim 1, further arranged to combine the computed channel estimates with an inter-path cancellation scheme.

11. The apparatus according to claim 10, wherein the chosen number of time intervals of the M slots is greater than 1.

12. The apparatus according to claim 1, wherein the J interpolation filters are arranged to generate J corresponding channel estimates respectively relating to the time instances Tj chosen.

13. The apparatus according to claim 12, wherein the chosen number of time intervals of the M slots is greater than 1.

14. The method according to claim 5, wherein the chosen number of time intervals of the M slots is greater than 1.

15. The method according to claim 5, further comprising:
combining the computed channel estimates with a Common Pilot Channel (CPICH) estimation to produce a refined channel estimation.

16. The method according to claim 15, wherein the chosen number of time intervals of the M slots is greater than 1.

17. The method according to claim 5, further comprising:
using the computed channel estimates to provide a quasi-pilot for a second iteration to produce a refined channel estimation.

18. The method according to claim 17, wherein the chosen number of time intervals of the M slots is greater than 1.

19. The method according to claim 5, further comprising:
combining the computed channel estimates with an inter-path cancellation scheme.

20. The method according to claim 5, further comprising:
the J interpolation filters generate J corresponding channel estimates respectively relating to the time instances Tj chosen.

* * * * *